(No Model.) 2 Sheets—Sheet 1.
R. F. LANGER.
TARGET METER.
No. 565,358. Patented Aug. 4, 1896.
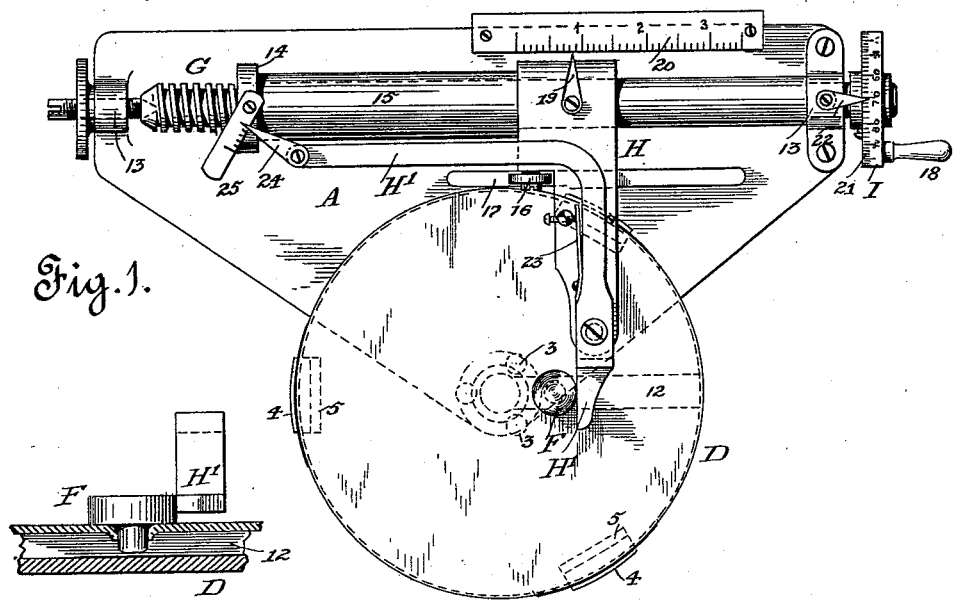
Fig. 1.
Fig. 4.
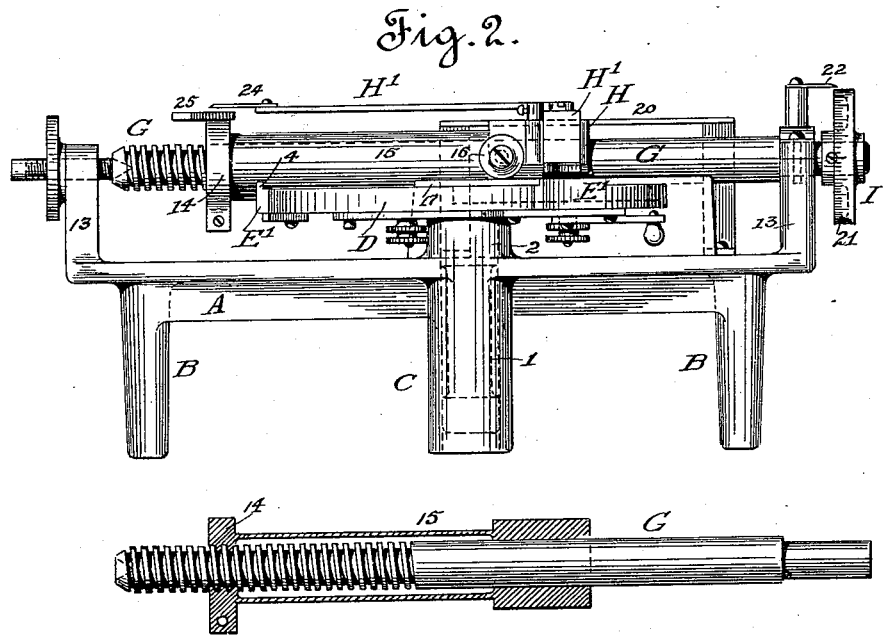
Fig. 2.
Fig. 3.
Witnesses.
Inventor.
Robert F. Langer
by Spear & Seely
Attorneys (No Model.)  2 Sheets—Sheet 2.

R. F. LANGER.
TARGET METER.

No. 565,358. Patented Aug. 4, 1896.

Witnesses.

Inventor.
Robert F. Langer
by Spear & Seely
Attorneys.

UNITED STATES PATENT OFFICE.

ROBERT F. LANGER, OF SAN FRANCISCO, CALIFORNIA.

TARGET-METER.

SPECIFICATION forming part of Letters Patent No. 565,358, dated August 4, 1896.

Application filed March 6 1896. Serial No. 582,091. (No model.)

*To all whom it may concern:*

Be it known that I, ROBERT F. LANGER, a citizen of the United States, residing at San Francisco, in the county of San Francisco and State of California, have invented certain new and useful Improvements in Target-Meters; and I do hereby declare that the following is a full, clear, and exact description thereof.

In target shooting at the present day the bull's-eye is a circular piece of paper or thin paper-board generally six inches in diameter and affixed to but removable from the center of a larger target. After the conclusion of a match the bull's-eyes are removed and the best ones of the several competitors are compared and measured by skilled and expert judges. This judging and measuring is a matter of time, labor, difficulty, and great responsibility, and frequently results, after long discussion and a great amount of measuring and remeasuring, in the declaration of ties— always an unsatisfactory result to the competitors, as well as to the judges who declare them, because their decisions are generally questioned. Now while a tie between two rifle shots is theoretically possible, still if the human eye and hand were capable of measuring the thousandth part of an inch it would never occur.

The object of my invention is to provide a target-meter of simple construction which will measure and indicate differences in distance too small to be observed by the human eye, and which in its operation requires no expert manipulation, because it eliminates the personal equation, or error inseparable from the measurements of any particular person. It also results in a great saving of time in measurement, and as, when properly constructed, it is infallible, its decisions can never be questioned. It does away with ties, and instead gives actual differences in distance to the thousandth of an inch if necessary. The machine by which I accomplish these results is fully hereinafter explained, and is shown in the accompanying drawings, in which—

Figure 5:
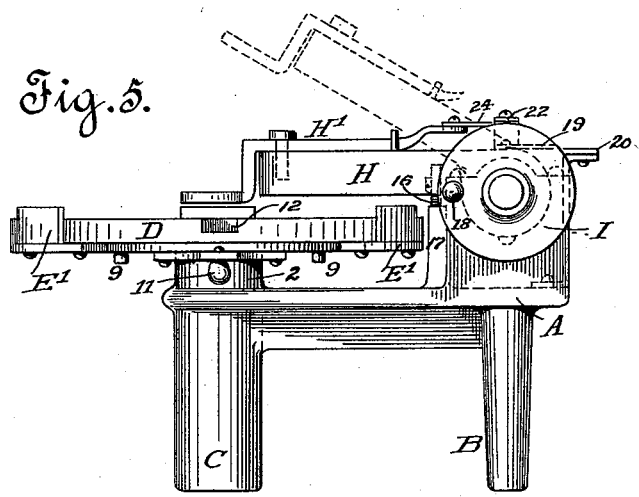
Figure 6:
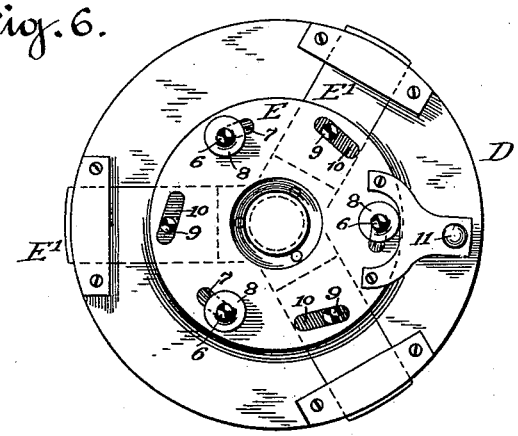

Figure 1 is a plan view. Fig. 2 is a front elevation. Fig. 3 is a longitudinal section of the traveling sleeve and the screw which gives it motion. Fig. 4 is a detail section of a bull's-eye under measurement, which is shown in plan view in Fig. 1. Fig. 5 is an elevation. Fig. 6 is a bottom plan of the universal chuck for centering the bull's-eye previous to measuring the shot.

A represents a table supported upon legs or pillars B, B', and C, and shown as of triangular shape with the pillar C at the apex in front. The pillar C is hollow to receive the stem 1 of the rotary plate D, such stem and its bearings in the pillar being in dotted lines in Fig. 2. The pillar extends above the table in the form of a hollow boss 2, and the head of the stem within such boss is secured to the plate D by screws 3 3, so that the plate can turn in either direction, its motion being made steady and level by the long bearing of the stem 1. The plate D, which is circular and of the same size as the circular bull's-eyes to be measured, carries upon its bottom surface a universal centering device composed of a circular disk E and radial slides E', the latter having flanges 4, which turn upwardly above the circumference of plate D and which move in and out of recesses 5, formed in the edge of said plate. The disk E is guided on the bottom of the plate D by screws 6, which project through concentric slots 7, and are provided with tightening-nuts 8. Each of the slides E' has a stud 9, which enters a slot 10, formed in the disk E. These slots 10 are slightly inclined to a radius of the plate E', so that when the plate is turned by the handle 11 all the slides move together, radially, in or out, as the case may be. The round bull's-eye, set upon the plate D, while the slides are set outward, will be truly and accurately centered by the act of moving all the slides inward simultaneously.

A radial channel 12 extends from the center to the circumference of the face of plate D, which is shown in dotted lines in Fig. 1, where it is supposed to be covered by the paper bull's-eye. The bullet-hole to be measured is brought above this channel when the paper is placed in position, and through said hole is passed a plug F, Fig. 4, having a head which rests firmly upon the paper, while the plug itself extends into the channel 12. This plug is of the known caliber of the bullet which made the hole, and hence several of such plugs may be provided for different occasions.

The plug now makes known the position of the bullet-hole relatively to the center of the bull's-eye.

At the ends of the table A are standards 13, which form or receive bearings for a rod G, which is partly threaded, Fig. 3. On this screw-rod is a traveling nut 14, to which is secured a sleeve 15, which surrounds the rod for a portion of its length. Secured to this sleeve and traveling with it is an arm H, which projects forward over the plate D, and which is guided by a roller 16, moving upon a stationary track 17 between the screw-rod and the bull's-eye plate. This roller insures an easy and steady motion of the sleeve upon the screw, and also keeps the arm H horizontal and out of contact with the bull's-eye being measured. The screw is turned and the sleeve and arm H caused to travel by a crank 18 on a disk I, secured at one end of the screw-rod. The threads of the screw are proportioned to the inch upon any scale desired; but I prefer to calculate in decimal parts of inches, and hence have provided that a complete turn of the screw shall move the sleeve 15 one-tenth of an inch. These tenths of inches are indicated by a pointer 19, which moves with the sleeve upon a fixed gage 20, secured to the table. By manipulating the crank 18 so as to bring the arm H in contact with the head of plug F, as shown in Fig. 1, the first rough measurement of the shot will be expressed by tenths of inches on the gage 20. Far greater accuracy than this is, however, required, and is provided for by my machine.

Upon the edge of the disk I is a scale 21, divided into one hundred parts, in connection with which is a fixed pointer 22. Since one complete revolution of the disk equals one-tenth of an inch on the gage 20, the division of such disk, as stated, gives hundredths and thousandths of inches on scale 21, and hence scales 20 and 21, read together, will give me the position of the bullet-hole relatively to the center of the bull's-eye down to the thousandth part of an inch or even less. This is on the assumption that the arm H has been adjusted to a true tangent with the head of stud F; but the impossibility of judging by eye or touch of this fact renders necessary another feature of my invention, which, briefly stated, is the magnifying of any variation from a true tangent, so as to make that variation easily visible. This device is shown in Fig. 1. By reference to that figure it will be seen that the surface in contact with plug F is not the arm H, but a lever H', pivoted to the arm H, and held normally in line with it by a spring 23. The lever is bent at right angles and extends to the extremity of the sleeve, and has a pointer 24 above a small scale 25, secured to the sleeve. The short arm of the lever forms the contact or tangent surface. Any movement of the short arm of the lever is greatly multiplied at the end of the long arm, and will be evidenced by a vibration of pointer 24. The measurer turns the screw and adjusts the arm H and contact as nearly as possible to a true tangent, holding the plug in one hand and the crank in the other. If the contact H' is pressed too firmly against the plug, a gentle oscillation of the plate D back and forth will cause the plug to act as a cam against the contact and move the latter; and no matter how infinitesimal this movement may be it will be evidenced by a decided and perceptible vibration of the pointer 24. Gradually easing the pressure, by means of the crank, the tangent becomes true, and although a contact is made the pointer 24 shows no movement. Hence the true and and accurate position of the bullet-hole has been ascertained, and by reading scales 20 and 21 it is found that the true distance is .871 of an inch from the center, (to take the supposititious position shown in the drawings.) Another shot, which this machine would show to be .875 of an inch from the center, would have to be counted as a tie when the ordinary system of measurement by hand and eye is used, the difference being too small to be discerned. Hence I eliminate skill in measurement, which is always a personal quality and therefore uncertain, and substitute for it mechanical accuracy which cannot be questioned. The arms H and H' can be thrown upward with the sleeve, Fig. 5, in order to allow the bull's-eye to be placed upon the supporting-plate. It should be noted that the heads of the plug F should be made of uniform size, and that an allowance is made for their diameter in commencing to mark the gage or scale 20, as shown in Fig. 1.

Claims are sometimes made by marksmen to absolute center shots, which are in fact so close that no ordinary means of measuring will show the real variation. My machine will not only indicate an actual center shot, but will also show a variation from center of even the thousandth part of an inch. When the plug is placed in an actual center shot, not only will both scales register zero, but the vibrating indicator 24 will remain at rest when the plate D is turned entirely around with the plug in contact with the lever H'; but the slightest variation from the center makes the plug a cam, which at some point of the revolution will cause the pointer 24 to vibrate.

What I claim is—

1. In a target-meter and in combination, a supporting-plate for the target, a disk movable beneath said plate and having inclined slots, flanged slides between said plate and disk, pins projecting from said slides into said slots, a removable plug or stop for indicating the position of a hole in the target, and indicating devices controlled by the position of said plug or stop, substantially as described.

2. In a target-meter, and in combination, a support for the target, means for centering the target upon the support, a removable plug or stop for indicating the position of a hole in the target, and indicating devices controlled by the position of said plug or stop, substantially as described.

3. In a target-meter and in combination, a movable support for the target, a removable plug or stop for indicating the position of a hole in the target, an arm adapted to be adjusted tangent to said plug, measuring-gages controlled by the adjustment of said arm, and an indicator for showing variation from a true tangent, substantially as described.

4. In a target-meter, and in combination, a support for a target, a movable plug or stop for indicating the position of a hole in the target, a screw-threaded rod, and an arm traveling thereon adjacent to a scale which is proportionate to said screw-thread, said arm being capable of adjustment into contact with said plug, substantially as described.

5. In a target-meter, means for supporting a target and means for indicating a hole in said target, a rotary screw-rod, an arm traveling thereon and adjustable relatively to said indicating means, and to a gage or scale, and a second gage or scale carried by the rotary screw, and bearing fractions of the first-named scale, substantially as described.

6. In a target-meter, a circular plug for indicating the position of a hole in said target, in combination with gages for indicating the distance of said hole from the center of the target, an adjustable lever, means for adjusting said lever to a tangent with said plug and thereby indicating its distance upon said gages, and means for moving said plug in contact with the lever whereby its long arm will visibly indicate a variation from a true tangent, substantially as described.

7. In a target-meter, a support for bull's-eye, or target, a screw having its threads proportionate to definite fractions of distance (such as tenths of inches), an arm adjustable on said screw relatively to a bullet-hole in the target, and, by its adjustment, indicating said fractional distances, upon a scale; a disk secured upon said screw, and carrying a scale which indicates fractions of the distance upon the first scale (such as thousandths of inches); all constructed and arranged so that the correct adjustment of said arm to the bullet-hole will indicate the total fractional distance upon both scales when read together; means for adjusting the arm correctly to the bullet-hole, and means for proving the correctness of the adjustment, substantially as described.

8. In a target-meter, a rotary support for a target, having a radial groove, and a plug adapted to fit a hole in said target and to enter said groove, and having a head which rests upon and above the target, in combination with indicating devices adjustable relatively to said plug, substantially as described.

9. In a target-meter, a target-support, means for indicating the position of a hole in said target, an arm traveling upon a screw and adjustable relatively to said hole, a roller on said arm, and a guide-track for said roller forming a movable point of support for said arm at a distance from the screw, substantially as described, and for the purposes set forth.

10. In a target-meter, the target-support and the removable plug F, in combination with the traveling arm H, means for adjusting the said arm for the purposes set forth, the pivoted lever H', forming a continuation of said arm, and a spring for holding said lever normally in line with said arm, substantially as described.

In testimony whereof I have affixed my signature, in presence of two witnesses, this 25th day of February, 1896.

ROBERT F. LANGER.

Witnesses:
F. E. MONTEVERDE,
L. W. SEELY.